Figure 1:
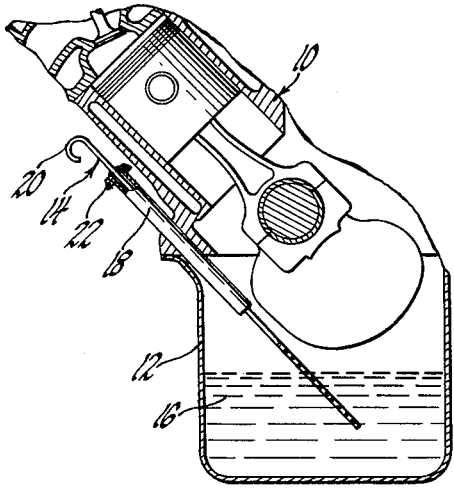

Jan. 26, 1965     M. C. C. CHISHOLM     3,166,849
LIQUID LEVEL GAUGE
Filed June 9, 1961

INVENTOR.
Matthew C.C. Chisholm
BY
Winnie and Barnard
ATTORNEYS 3,166,849
LIQUID LEVEL GAUGE
Matthew C. C. Chisholm, Wynnewood, Pa., assignor to Teleflex Incorporated, North Wales, Pa., a corporation of Delaware
Filed June 9, 1961, Ser. No. 115,954
7 Claims. (Cl. 33—126.7)

This invention relates to a new and improved liquid level gauge for indicating the level of oil in an engine crankcase, or any device in which it is important to know the quantity of oil contained in the mechanism.

It is an object of the present invention to provide an oil level gauge or dipstick which when inserted in the crankcase is partially immersed in oil so that a portion of the surface thereof is wetted by the oil in such a way as to permit a clear visual reading of the quantity of oil on hand.

It is a further general object of the present invention to construct the gauge or dipstick in such a way as to utilize capillary action to provide a clear visual measure of oil level. While the use of capillary action is generally old in oil level gauges, the present invention is so constructed and arranged as to provide a gauge which is greatly simplified so as to make manufacture extremely inexpensive.

It is a more specific object of the present invention to construct an oil gauge from a single or a plurality of wire members formed to provide a plurality of capillary openings along the length of the dipstick.

In the past, dipsticks have been traditionally formed of flat strip or rod stock, the basic cost of which is considerably greater than the cost of the wire stock utilized in the present invention. Further, presently used dipsticks of the inexpensive variety are difficult to use since the oil film which has very little color is viewed against an opaque metal background.

In the present invention, an inexpensive dipstick construction is achieved wherein the oil film is exposed in a way to permit easy viewing of oil level.

The details as well as other objects and advantages of the present invention will be apparent from a perusal of the detailed description which follows.

In the drawings:

FIGURE 1 illustrates the subject dipstick associated with the crankcase of internal combustion engine; and FIGURES 2-6 are various embodiments of the subject invention.

Referring to FIGURE 1, an internal combustion engine is indicated generally at 10 and includes a crankcase 12 within which a dipstick 14 is adapted to extend to measure the level of the oil 16 therein. A dipstick supporting tube 18 is mounted within the engine block to position the stick in the proper attitude for measurement of oil level.

The upper end of dipstick 14 is bent or formed to provide a finger engaging portion or loop 20 just below which a cap 22 is fixed to both enclose the dipstick supporting tube to prevent the egress of oil therefrom as well as to limit the extent of insertion of the dipstick within the crankcase.

The basic concept embodied in the present invention is the utilization of a wire element or elements variously formed or twisted to provide a plurality of longitudinally spaced openings which permit the capillary action of the oil to support a film of oil to indicate the quantity of oil in the particular reservoir utilized. By thus utilizing a wire member or members, the dipstick construction is extremely inexpensive due both to the low cost of the wire material as well as the ease with which the same may be formed to provide the capillary cavities or openings previously recited. With respect to the matter of formation, no metal stamping, punching, cutting, or other metal removing operations are necessary which immediately reduces labor and material costs.

Figure 2:
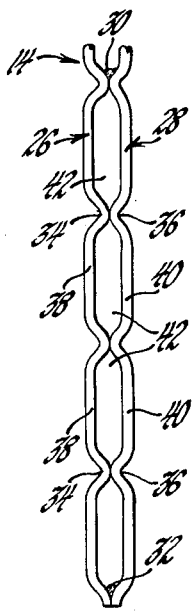

Referring first to the modification of FIGURE 2, dipstick 14 comprises a pair of identically formed wire members 26 and 28 which may be placed in face-to-face relationship and suitably secured at various places 30 and 32 as by welding, or the like. The wire members 26 and 28 are formed to provide a plurality of longitudinally spaced dents or dimples 34 and 36 intermediate straight sections 38 and 40.

To assemble the dipstick, wire members 26 and 28 are arranged so that dimples 34 and 36 are in abutting relationship thereby forming a plurality of longitudinally spaced capillary cavities or openings 42 therebetween. Since it is unnecessary that each set of the opposing dimples 34-36 be held together tightly, periodic of these sets may be joined with whatever frequency is desired to provide the requisite structural strength for the dipstick. As seen in FIGURE 2, one set of dimples may be welded with the next three simply being permitted to freely abut.

Alternatively, the dip stick may be formed by securing the wires 26 and 28 together at spaced points and then distending the assembly between the points of securement. This may be done in any suitable manner as by inserting a tool between the wires 26 and 28 and locally stretching or otherwise outwardly forming the wires to provide the capillary cavities between the imperforate or joined points.

Figure 3:
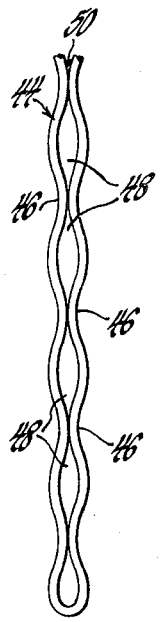

In the modification of FIGURE 3, a single length of wire 44 is utilized to further simplify manufacture. In this case, the single length of wire is formed in an undulating fashion and thereafter bent so as to place the depressions 46 in proximate and abutting relationship which once again forms longitudinally spaced capillary openings 48. Here again, the abutting portions may be periodically welded or otherwise joined, such as at 50, to maintain the predetermined configuration of the dipstick.

Figure 4:

A variation of the single wire construction is shown in FIGURE 4 in which the capillary openings 52 are formed simply by twisting the wire 54 over itself to provide the appropriate longitudinally spaced loops.

Figure 5:
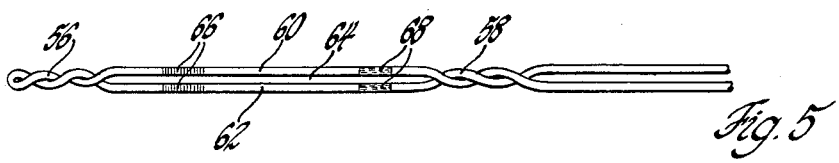

In FIGURE 5, a still further variation is achieved by utilizing a single element of wire which is closely twisted at 56 and 58 intermediate which are straight sections 60 and 62. The straight sections are formed to provide an extended capillary opening 64. In this case, sections 60 and 62 could be marked as with color bands 66 and 68, e.g. red or green, to indicate "add" or "full" relative to oil level.

Figure 6:
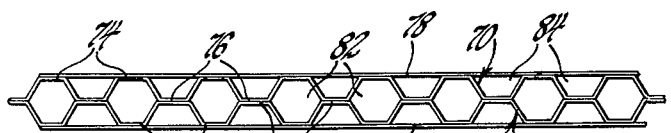

In the final modification of FIGURE 6, an arrangement is achieved which permits the use of even finer wire appropriately reinforced to provide the requisite gauge strength. In this case, a pair of wire members 70 and 72 are again identically formed so as to provide raised and depressed linear portions 74-75 and 76-77. The elements are then positioned so as to place the depressed portions 76-77 in abutting relationship and as in the previous modifications are periodically secured at the abutting edges.

Additionally, a pair of straight wire members 78 and 80 are secured to the respective raised portions 74-75 of each of the elements whereby the dipstick is suitably reinforced to provide adequate strength. In this case, capillary openings 82 and 84 are formed between members 70 and 72 as well as between these members and straight wires 78 and 80 respectively.

In all of the modifications, suitable markings either by coloring, notching, or the like, are provided along the length of each of the dipsticks to indicate that the crankcase is "full" or of the necessity to "add" oil.

It is apparent that other dipstick modifications are possible in addition to those illustrated and within the intended scope of the invention as set forth in the hereinafter appended claims.

I claim:

1. A liquid level gauge comprising a narrow elongated member having a longitudinal axis, said member being periodically and symmetrically distended along and transversely of said axis to provide a plurality of longitudinally spaced capillary openings.

2. A liquid level gauge comprising a narrow elongated member having a longitudinal axis, said member having a plurality of longitudinally spaced imperforate portions, said member being periodically and symmetrically distended along and transversely of said axis to provide a plurality of longitudinally spaced capillary openings alternately disposed with said imperforate portions.

3. A liquid level gauge comprising a narrow elongated member having a longitudinal axis, said member having a plurality of longitudinally spaced imperforate portions of the same width, said member being periodically and symmetrically distended along and transversely of said axis to provide a plurality of longitudinally spaced capillary openings alternately disposed with said imperforate portions, the transverse width of said member at said openings being greater than the width of said imperforate portions.

4. A liquid level gauge comprising a pair of wire elements formed to provide an elongated narrow member capable of being supported within a liquid containing receptacle, said elements including intermittent relatively raised and depressed portions disposed in face-to-face relationship such that the depressed portions are generally abutting, said oppositely disposed raised portions of each of said wire elements including a straight section to provide elongated capillary openings adapted to retain a film of liquid therein when the member is depressed within a liquid reservoir.

5. A liquid level gauge comprising wire means formed to provide an elongated narrow member capable of being supported within a liquid containing receptacle, said wire means including a pair of thin wire elements formed to provide a plurality of linearly spaced raised and depressed portions, said elements being secured together so as to place said depressed portions in abutting relationship, and a pair of straight wire elements respectively secured to the raised portions of each of the formed wire elements, said raised portions forming capillary openings adapted to retain a film of liquid therein when the member is depressed within a liquid reservoir.

6. A liquid level gauge comprising wire means formed to provide an elongated narrow member capable of being supported within a liquid containing receptacle, said member including intermittent relatively raised and depressed portions disposed in face-to-face relationship such that the depressed portions are generally abutting, said oppositely disposed raised portions forming capillary openings adapted to retain a film of liquid therein when the member is depressed within a liquid reservoir, said wire means comprising a pair of wire elements periodically secured at their depressed portions to provide a unitary structure.

7. A liquid level gauge as set forth in claim 6 in which said wire means comprises a single length of wire twisted over itself to provide a plurality of longitudinally spaced loops forming the capillary openings.

References Cited by the Examiner
UNITED STATES PATENTS

| 1,948,310 | 2/34 | Oliver et al. | 33—126.7 |
| 2,799,089 | 7/57 | Banker | 33—126.7 |

OTHER REFERENCES

Pages 41 and 42, 1942, Introduction to Microtechnique of Inorganic Analysis.

ISAAC LISANN, *Primary Examiner.*